US012625808B2

(12) United States Patent
Abdelsalam et al.

(10) Patent No.: US 12,625,808 B2
(45) Date of Patent: May 12, 2026

(54) CACHE MEMORY SUPPORTING DATA OPERATIONS WITH PARAMETRIZED LATENCY AND THROUGHPUT

(71) Applicant: Microsoft Technology Licensing, LLC, Redmond, WA (US)

(72) Inventors: Ahmed Abdelsalam, Redmond, WA (US); Vishalkumar Shantilal Gondaliya, Redmond, WA (US); Anshuman Verma, Redmond, WA (US); Robert Groza, Jr., Redmond, WA (US); Dongwook Lee, Redmond, WA (US); Ezzeldin Hamed, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 412 days.

(21) Appl. No.: 18/109,713

(22) Filed: Feb. 14, 2023

(65) Prior Publication Data

US 2024/0273021 A1    Aug. 15, 2024

(51) Int. Cl.
*G06F 12/0804* (2016.01)

(52) U.S. Cl.
CPC ............................... *G06F 12/0804* (2013.01)

(58) Field of Classification Search
CPC .................................................. G06F 12/0804
See application file for complete search history.

(56) References Cited

U.S. PATENT DOCUMENTS

| | | | |
|---|---|---|---|
| 6,535,957 B1 * | 3/2003 | Arimilli | G06F 9/30185 |
| | | | 712/E9.035 |
| 2009/0204870 A1 | 8/2009 | Bieth | |
| 2013/0159684 A1 | 6/2013 | Fetterman | |
| 2015/0106597 A1 | 4/2015 | Godard | |
| 2015/0220343 A1 | 8/2015 | Godard | |
| 2015/0309792 A1 | 10/2015 | Meier | |
| 2016/0246604 A1 | 8/2016 | Winrow | |
| 2017/0132140 A1 | 5/2017 | Lin | |
| 2019/0042475 A1 | 2/2019 | Ghosh | |
| 2020/0371918 A1 * | 11/2020 | Chachad | G06F 3/0685 |
| 2020/0371964 A1 * | 11/2020 | Bhoria | G06F 13/1689 |
| 2022/0237020 A1 | 7/2022 | Brewer | |
| 2022/0414013 A1 * | 12/2022 | Alsop | G06F 12/0857 |

OTHER PUBLICATIONS

International Search Report and Written Opinion received for PCT Application No. PCT/US2024/015083, May 6, 2024, 14 pages.
International Preliminary Report on Patentability (Chapter I) received for PCT Application No. PCT/US2024/015083, dated Aug. 28, 2025, 08 pages.

* cited by examiner

*Primary Examiner* — Prasith Thammavong
(74) *Attorney, Agent, or Firm* — Ray Quinney & Nebeker P.C.; Tiffany B. Healy

(57) ABSTRACT

The present disclosure relates to a cache memory and methods that handle data forwarding from the cache memory to an action block to perform an action on the data. The action block performs an action on the data and outputs modified data in response to performing the action. The cache memory and methods use a latency parameter for data forwarding to prevent data hazards from occurring and to meet timing requirements and performance requirements of the cache memory.

8 Claims, 6 Drawing Sheets

400

Receiving, at a cache memory, a cache input request for data — 402

Determining the data is in the cache memory — 404

Providing the data to an action block based on a latency parameter of an action performed by the action block — 406

Receiving, from the action block, modified data in response to the action block performing the action on the data — 408

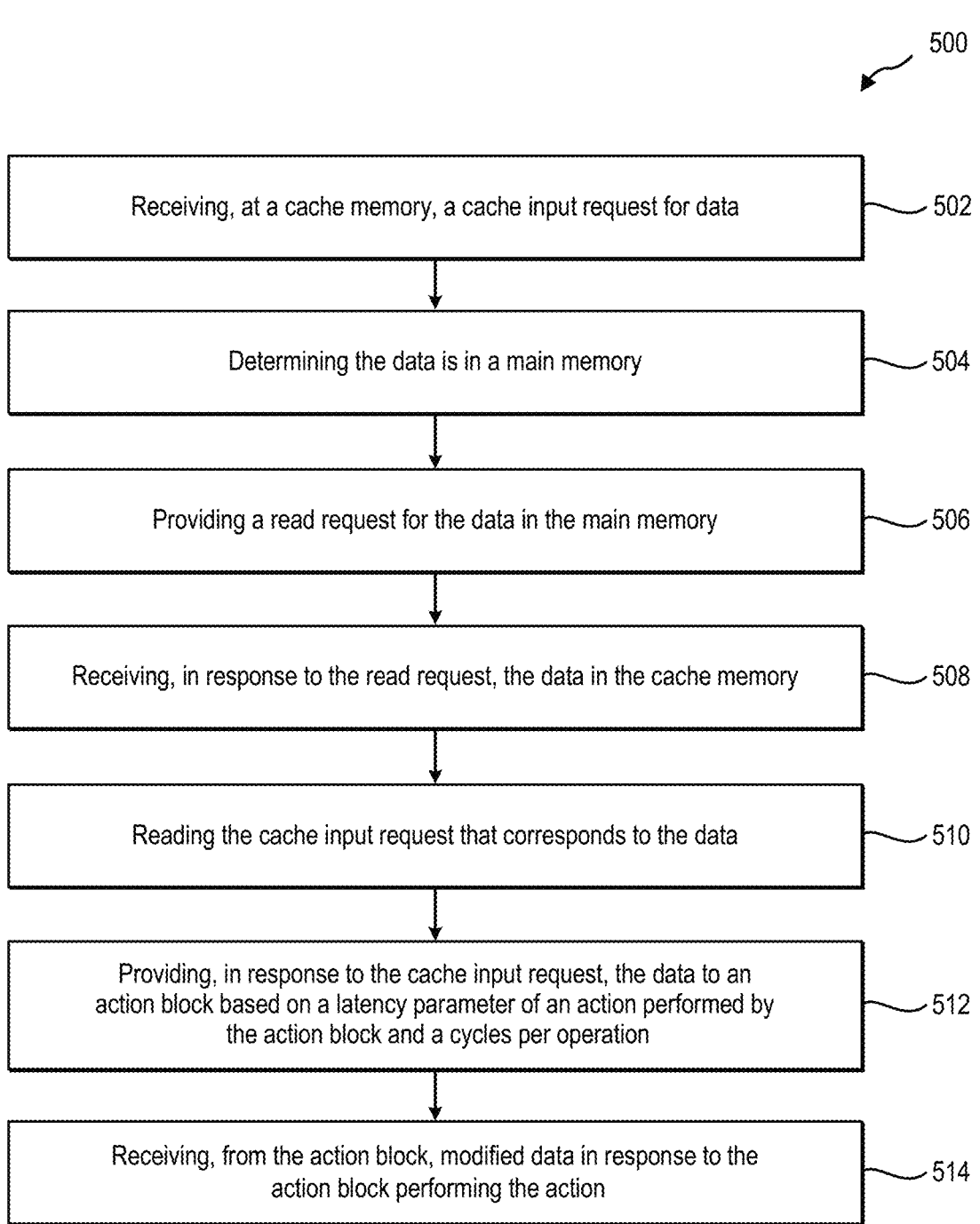

500

Receiving, at a cache memory, a cache input request for data — 502

Determining the data is in a main memory — 504

Providing a read request for the data in the main memory — 506

Receiving, in response to the read request, the data in the cache memory — 508

Reading the cache input request that corresponds to the data — 510

Providing, in response to the cache input request, the data to an action block based on a latency parameter of an action performed by the action block and a cycles per operation — 512

Receiving, from the action block, modified data in response to the action block performing the action — 514

Receiving modified data from an action block based on a latency parameter ⟍ 602

Providing a write request to write the modified data to main memory ⟍ 604

Sending a write request to the main memory to write the
modified data in the main memory ⟍ 606

CACHE MEMORY SUPPORTING DATA OPERATIONS WITH PARAMETRIZED LATENCY AND THROUGHPUT

BACKGROUND

Cache memories are small and fast memories that are widely used in different computing systems. The main purpose of utilizing cache memories is to bring data from main memories closer to processing units. However, different systems require operations or actions to be applied on the data read from the cache before passing it to processing unit. Although the operations or actions may be simple, complex logic around these operations (e.g., forwarding logic, handling data hazards, etc.) are required to meet proper timing and performance requirements.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a method. The method includes receiving, at a cache memory, a cache input request for data. The method includes determining the data is in the cache memory. The method includes providing, in response to the cache input request, the data to an action block based on a latency parameter of an action performed by the action block.

Some implementations relate to a cache memory. The cache memory includes a tag manager component that receives a cache input request for data and determines that the data is in the cache memory; and a data manager component that provides, in response to the cache input request, the data to an action block based on a latency parameter of an action performed by the action block.

Some implementations relate to a method. The method includes receiving, at a cache memory, a cache input request for data. The method includes determining the data is in a main memory. The method includes providing a read request for the data in the main memory. The method includes receiving, in response to the read request, the data in the cache memory. The method includes reading the cache input request that corresponds to the data. The method includes providing, in response to the cache input request, the data to an action block based on a latency parameter of an action performed by the action block and a cycles per operation parameter of the action block. The method includes receiving, from the action block, modified data in response to the action block performing the action.

Some implementations relate to a cache memory. The cache memory includes a tag manager component that receives a cache input request for data and determines that the data is in in a main memory; a read request component that provides a read request for the data in the main memory; and a data manager component that receives, in response to the read request, the data in the cache memory; reads the cache input request that corresponds to the data; provides, in response to the cache input request, the data to an action block based on a latency parameter of an action performed by the action block and a cycles per operation parameter of the action block; and receives, from the action block, modified data in response to the action block performing the action.

Some implementations relate to a method. The method includes receiving modified data from an action block based on a latency parameter that identifies a number of clock cycles for the action block to perform an action on data. The method includes sending a write command to write the modified data to main memory in response to receiving a write request from the data manager component.

Some implementations relate to a cache memory. The cache memory includes a data manager component that receives modified data from an action block based on a latency parameter that identifies a number of clock cycles for the action block to perform an action on data; and a write back component in communication with the data manager component that sends a write command to write the modified data to main memory in response to receiving a write request from the data manager component.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 5 illustrates an example method for providing data to an action block in response to determining the data is in main memory in accordance with implementations of the present disclosure.

DETAILED DESCRIPTION

This disclosure generally relates to cache memories. Cache memories are small and fast memories that are widely used in different computing systems. The main purpose of utilizing cache memories is to bring data from main memories closer to processing units. However, different systems require operations or actions to be applied on the data read from the cache before passing it to processing unit. Although the operations or actions may be simple, complex logic around these operations (e.g., forwarding logic, handling data hazards, etc.) are required to meet proper timing and performance requirements. For example, assume that cache_1 has data, and wants to apply ACTION_A to the data. Assume further that cache_1 has data and wants to apply ACTION_B to the data. Since ACTION_A and ACTION_B are different and take different number of clock cycles, they require different forwarding logic to be applied to the cache design to meet timing.

Figure 1:
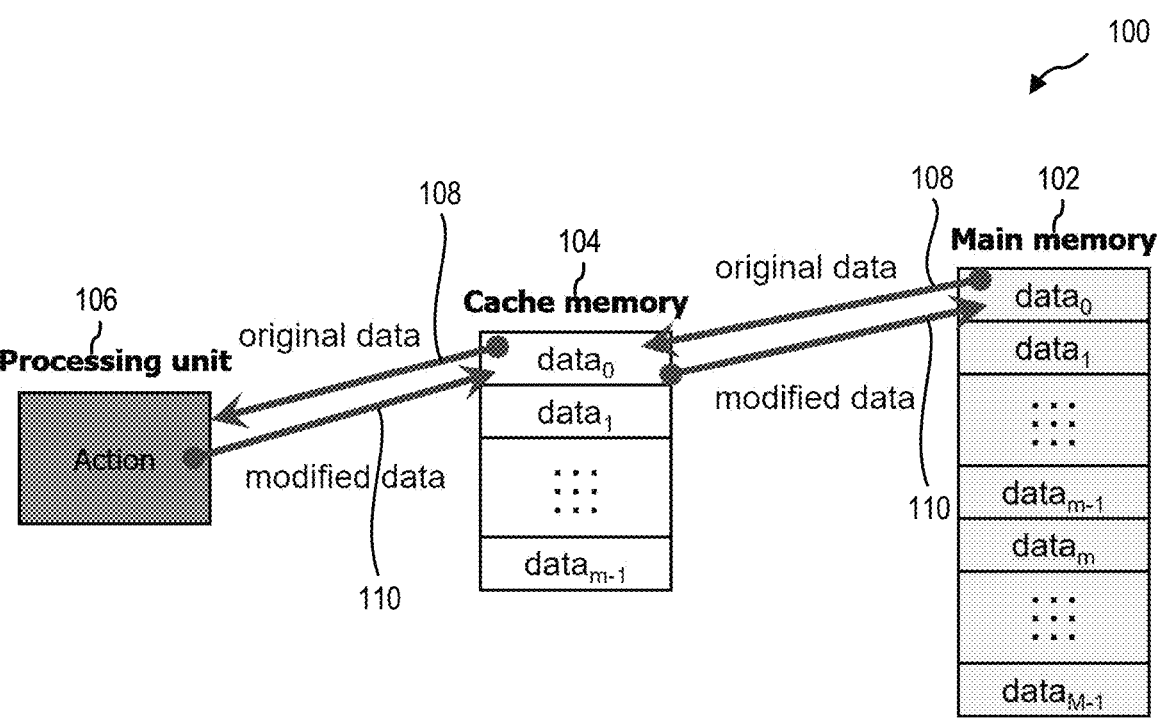
FIG. 1 illustrates an example of a current read-modify-write cache memory solution.

Referring now to FIG. 1, illustrated is an example environment 100 for a current cache memory solution. The environment 100 includes a main memory 102 in communication with a cache memory 104. The cache memory 104 is a small fast memory that resides between the main memory 102 and a processing unit 106. The main memory 102 is slower than the processing unit 106, and thus, current solutions use the cache memory 104 to provide the data to the processing unit 106 at the same speed as the processing unit 106.

The cache memory 104 is a read-modify-write cache memory where the processing unit 106 fetches the original data 108 from the cache memory 104 and process the original data 108 by performing an action or operation on the original data 108. The processing unit 106 generates modified data 110 in response to performing the action or operation on the original data 108. The processing unit 106 provides the modified data 110 back to the cache memory 104. The cache memory 104 updates the main memory 102 with the modified data 110 by writing the modified data 110 to the main memory 102 periodically.

One problem with the environment 100 is data hazards. A data hazard is different data (e.g., different data for $data_0$) between different requests for the data. A data hazard occurs when a current data request depends on a previous data request that has not yet been completed by the processing unit 106. One example where data hazards occur includes back to back requests for the same data (e.g., $data_0$). For example, at time slot A, a request for the $data_0$ is received and the processing unit 106 modifies the $data_0$, (e.g., by applying an operation and/or action to the $data_0$). At a next time slot, time slot B, a second request for $data_0$ is received. However, the cache memory 104 still has the original data for $data_0$ at the time slot B when the second request is received since the processing unit 106 is still modifying the data for $data_0$.

One example use case includes $data_0$ is equal to 37 in the original data 108 and the action performed by the processing unit 106 is a mathematical operation (e.g., 43 multiplied by $data_0+76$). Assume that this action takes three clock cycles to perform, and thus, the processing unit 106 takes three clock cycles to show the output (the modified data 110 for $data_0$ (1667)). If back to back requests are received by the cache memory 104 for $data_0$ (a first request for $data_0$ at time slot A and a second request for $data_0$ at time slot B), a data hazard occurs because the second request uses old data (37) since the new data (1667) is not ready yet.

One existing solution for data hazards is to stall the cache pipeline. The cache memory 104 does not accept new requests for the same data until the existing request is complete on the same data. This solution causes performance issues by pausing the cache pipeline until requests are completed.

Another existing solution for data hazards is data forwarding. Data forwarding allows new request but reads the data from different pipeline stages to get the latest modified data instead of reading the data from the main memory or cache memory. Data forwarding requires extra logic (storing data in different pipeline stages and need to know where to read the data from the pipeline stages) and requires modifications (cache modifications) whenever action changes to meet proper timing and throughput requirements. Different actions may be processed differently with different pipeline stages. Thus, changing the action may require changing the data forwarding logic for determining when to read the data from the different pipeline stages and making modifications to the cache.

The systems and methods of the present disclosure provide parameterized data forwarding without requiring modifications to the cache whenever an action changes. The systems and methods of the present disclosure provides a cache memory that is used in different systems where actions are performed on the cache data. The cache memory allows users to perform actions on the cache data independently and the cache memory handles the logic around the data forwarding and timing considerations to prevent data hazards to meet proper timing and performance requirements of the cache memory.

The cache memory has a data manager that takes care of the forwarding logic and timing considerations of the data for the cache input requests. The cache memory has two parameters: 1) a latency parameter, which is the number of clock cycles to apply the action, and 2) a cycles per operation parameter, which is the throughput of the action block. For example, an action block with a latency equal to 2 and a cycles per operation equal to 1 means that the action block takes two clock cycles to apply the action to a single cached data, and the action block can accept a new input and shows an output every clock cycle. The parameters (the latency parameter and the cycles per operation parameter) are provided to the cache memory upon initialization of the cache memory. The parameters may change as the actions performed by the action block change or as the actions performed by the action block are modified. As such, the cache memory of the present disclosure is configurable for different actions without having to modify the cache memory each time the actions change.

The cache memory also has a tag manager component that decides whether an incoming cache request is a cache hit or a cache miss. A cache hit is when the data is in the cache. A cache miss is when a processing unit makes a request to retrieve data from a cache, but that specific data is not currently in cache memory. The cache needs to read the data from the main memory. The tag manager component is also responsible for the allocation/de-allocation scheme that determines where to allocate each data coming from main memory, which data to replace in the cache memory, and determines the validity of each data entry in the cache memory. For example, a main memory has 1000 data entries from data0 to data999, and a cache memory only has 100 data entries at a time. The 100 data entries in the cache can be any 100 data entries of the main memory based on the requests coming from a processing unit. The tag manager uses a mapping or allocation/deallocation algorithm to map the 1000 main memory data entries into the small 100 cache entries and to the cache memory change the data entries according to the incoming requests. The tag manager component also manages the incoming flush and/or invalidate requests. In case of a cache miss, the tag manager requests data from the main memory, and responds to the data manager with the corresponding data.

The data manager component is responsible for providing the data of the corresponding cache hits, and the corresponding responses from main memory in case of a cache miss. The data manager component is also responsible for issuing a write back request to the main memory, if needed. The data manager component passes the data to the action block where the action is applied according to the latency and the cycles per operation parameters. The action block responds to the data manager with the modified data after applying the action. The cache memory processes all incoming requests in order and does not support out of order processing.

One technical advantage of the systems and methods of the present disclosure is supporting different actions on the data in a cache memory. Another technical advantage of the systems and methods of the present disclosure is the latency, and the throughput of the action block are parametrized in a cache memory. Another technical advantage of the systems and methods of the present disclosure is handling data forwarding and timing considerations of the data in the cache memory. Another technical advantage of the systems and methods of the present disclosure is fully pipelined data in the cache memory. Another technical advantage of the systems and methods of the present disclosure is the ability to work with different types of cache memories including direct, set-associative, and full associative caches.

Figure 2:
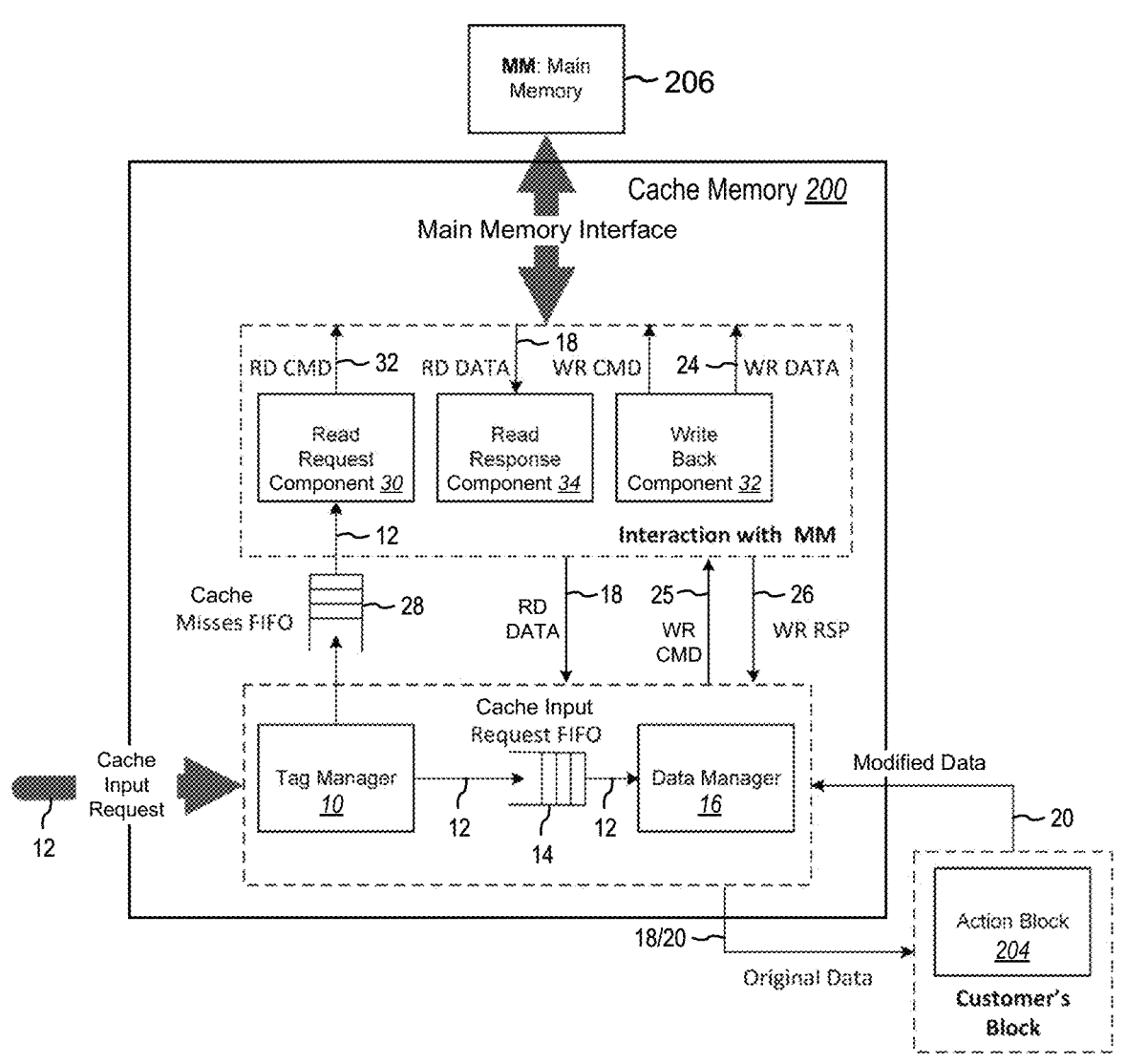
FIG. 2 illustrates an example read-modify-write cache memory in accordance with implementations of the present disclosure.

Referring now to FIG. 2, illustrated is an example of a read-modify-write cache memory 200. The cache memory 200 supports data operations with parameterized latency and throughput. The cache memory 200 is a small fast memory that resides between the main memory 206 and an action block 204. The action block 204 applies one or more actions on the data 18 in the cache memory 200. In some implementations, the actions are mathematical operations. In some implementations, the actions are logical operations. An example logical operation includes if the data 18 is greater than 572099 then the modified data equals zero. In some implementations, the actions are a combination of both mathematical and logical operations. In some implementations, the action block 204 performs a single action on the data 18. In some implementations, the action block 204 performs a plurality of actions on the data 18. The plurality of actions includes the same latency and throughput for performing the actions.

The cache memory 200 includes a tag manager 10 that receives a cache input request 12. The cache input request 12 identifies data 18 to send to the action block 204. In some implementations, the cache input request 12 also identifies an action to perform on the data 18. One example of the cache input request 12 includes a valid input request that will not be accepted by the cache memory 200 until the cache memory 200 is ready. Another example of the cache input request 12 includes a valid request that determines whether the cache memory 200 is valid. Another example of the cache input request 12 includes a metadata request that indicates information about the cache input request 12 and/or the data 18 to pass to a user. Another example of the cache input request 12 includes an address request that identifies the memory address in the main memory 206 of the data 18. Another example of the cache input request 12 includes a hash request that provides a hashed memory address to access the cache instead of the original main memory address for better addresses mapping. Another example of the cache input request 12 includes an invalidate request that invalidates the corresponding entry in the cache memory 200 for the data 18. Another example of the cache input request 12 is an action request that identifies the action for the action block 204 to perform on the data 18. Another example of the cache input request 12 is a write back request to write the corresponding modified data 20 entry in the cache memory 200 to the main memory 206 (e.g., DRAM). Another example of the cache input request 12 is a full write request to write a new data value to the cache memory 200 from the action block 204. Another example of the cache input request 12 is an if cached request that applies an invalidate request, an action request, a write back request, or a full write request if the data 18 is in the cache memory 200. Another example of the cache input request 12 is an all cached request that applies an invalidate request, an action request, a write back request, or a full write request to all cache lines in the cache memory 200.

The tag manager 10 determines whether the data 18 identified in the cache input request 12 is in the cache memory 200 (a cache hit) or the data 18 requested in the cache input request 12 is in the main memory 206 (a cache miss). The tag manager 10 is also responsible for the allocation and de-allocation scheme that determines where to allocate each data coming from the main memory 206, which data to replace in the cache memory 200, and the validity of each data entry in the cache memory 200. In addition, the tag manager 10 handles the incoming flush and/or invalidate requests for the cache memory 200.

If a cache hit occurs (the tag manager 10 determines that the data 18 is in the cache memory 200), the tag manager 10 forwards the cache input request 12 to a first in first out (FIFO) queue 14 of the cache input requests 12. A data manager 16 in communication with the FIFO queue 14 obtains the first cache input request 12 from the FIFO queue 14 and the data 18 that corresponds to the first cache input request 12 from the cache memory 200. The data manager 16 processes the incoming cache input requests 12 in order by using the FIFO queue 14.

If a cache miss occurs (the tag manger 10 determines that the data 18 identified in the cache input request 12 is in the main memory 206 instead of the cache memory 200 or determines that the data entry in the cache memory 200 for the data 18 has been invalidated), the tag manager 10 forwards the cache input request 12 to a FIFO queue 28. The tag manager 10 also forwards the cache input request 12 to the FIFO queue 14 of the cache input requests 12.

A read request component 30 in an interaction that obtains the cache input request 12 from the FIFO queue 28 and provides a read command 32 to the main memory 206 for the data 18 identified in the cache input request 12. As illustrated in the figure, RD means read, CMD means command, WR means write, MM means main memory, and RSP means response. A read response component 34 receives the data 18 read from the main memory 206 and provides the data 18 to the data manager 16.

The data manager 16 obtains the cache input request 12 from the FIFO queue 14 and the data 18 that corresponds to the cache input request 12. In some implementations, the data manager 16 triggers a synchronization signal to the FIFO queue 14 to read a first cache input request 12 from the FIFO queue 14 and obtain the corresponding data 18 associated with the first cache input request 12. The data manager 16 provides parameterized data forwarding of the data 18 identified in the cache input request 12 to the action block 204.

The data manager 16 provides the data 18 to the action block 204 based on a latency parameter and a cycles per operation parameter for the action(s) provided by the action block 204. The latency parameter identifies a number of clock cycles to complete the action by the action block 204. The cycles per operation parameter identifies a throughput of the action block 204.

In some implementations, the latency parameter and the cycles per operation parameters are provided to the data manager 16 during initialization of the cache memory 200. For example, a user identifies the actions for the action block 204 to perform and provides the latency parameter and the cycles per operations parameters to the cache memory 200 for the selected actions. In some implementations, the latency parameter and the cycles per operation parameter are modified based on the different actions that the action block 204 applies to the data 18, resulting in easier configurability or modifications of the actions performed by the action block 204. By providing the latency parameters and the cycles per operation parameters to the data manager 16 during initialization of the cache memory 200, the cache memory 200 easily supports different actions without having to modify the cache memory each time the actions change.

The action block 204 receives the data 18 and performs one or more actions on the data 18. The action block 204 responds to the data manager 16 with the modified data 20 based on the action applied to the data 18.

The data manager 16 periodically provides a write command 25 to a write back component 22 to write the modified data 20 to the main memory 206. The write back component 22 provides a write request 24 to the main memory 206 with the modified data 20 to write to the main memory 206. The write back component 22 provides a write back response 26 to the data manager 16 indicating that the modified data 20 has been written to the main memory 206.

The data manager 16 handles the forwarding logic and timing considerations for the cache input requests 12 to prevent data hazards when multiple cache input requests 12 are for the same data 18 in the cache memory 200. A data hazard occurs when a current cache input request 12 for the data 18 depends on a previous cache input request 12 for the data that has not yet been completed by the action block 204. The data manager 16 uses the latency parameter and the cycles per operation parameter to determine whether the modified data 20 is in the cache memory 200 for the subsequent cache input requests 12. The data manager 16 reads the modified data 20 for the subsequent cache input requests 12 from different pipeline stages instead of the cache memory 200 in response to determining that the modified data 20 is not in the cache memory 200 (e.g., the action block 204 has not provided the modified data 20 to the data manager 16 in response to performing the action on the data 18 for the previous cache input request 12).

In some implementations, the data manager 16 determines pipeline stage correlation between the cache input requests 12 for the same data 18 (e.g., a number of clock cycles that differ between the first cache input request 12 and the second cache input request 12). The data manager 16 uses the pipeline stage correlation between the two cache input requests 12 in combination with the latency and cycle per operation parameters to determine which pipeline stage (e.g., clock cycle) to read the modified data 20 from for the second cache input request 12 received for the same data 18. The data manager 16 provides the modified data 20 to the action block 204 to perform the action on the modified data 20 for the second cache input request 12. By using the latency and the cycle per operation parameters to determine which pipeline stage to read the modified data 20 from, the data manager 16 handles the data forwarding and timing for the different cache input request 12 and prevents data hazards from occurring for subsequent cache input requests for the same data 18.

By using the latency parameter and the cycle per operations to perform the data forwarding, the cache memory 200 may easily support different actions performed on the data 18 in the cache memory 200 by the action block 204. As such, the cache memory 200 handles the data forwarding and timing logic, preventing data hazards from occurring in response to multiple cache input requests 12 being received for the same data 18 in the cache memory 200.

In some implementations, the cache memory 200 is used with one or more computing devices (e.g., servers and/or devices). The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the main memory 206, the cache memory 200 and the action block 204 are implemented wholly on the same computing device. Another example includes one or more subcomponents of the cache memory 200 and the action block 204 are implemented across multiple computing devices.

In some implementations, each of the components of the main memory 206, the cache memory 200, and the action block 204 is in communication with each other using any suitable communication technologies. In addition, while the components of the cache memory 200 are shown to be separate, any of the components or subcomponents may be combined into fewer components, such as into a single component, or divided into more components as may serve a particular implementation. In some implementations, the components of the cache memory 200 include hardware, software, or both. For example, the components of the cache memory 200 may include one or more instructions stored on a computer-readable storage medium and executable by processors of one or more computing devices. When executed by the one or more processors, the computer-executable instructions of one or more computing devices can perform one or more methods described herein. In some implementations, the components of the cache memory 200 include hardware, such as a special purpose processing device to perform a certain function or group of functions. In some implementations, the components of the cache memory 200 include a combination of computer-executable instructions and hardware.

Figure 3:
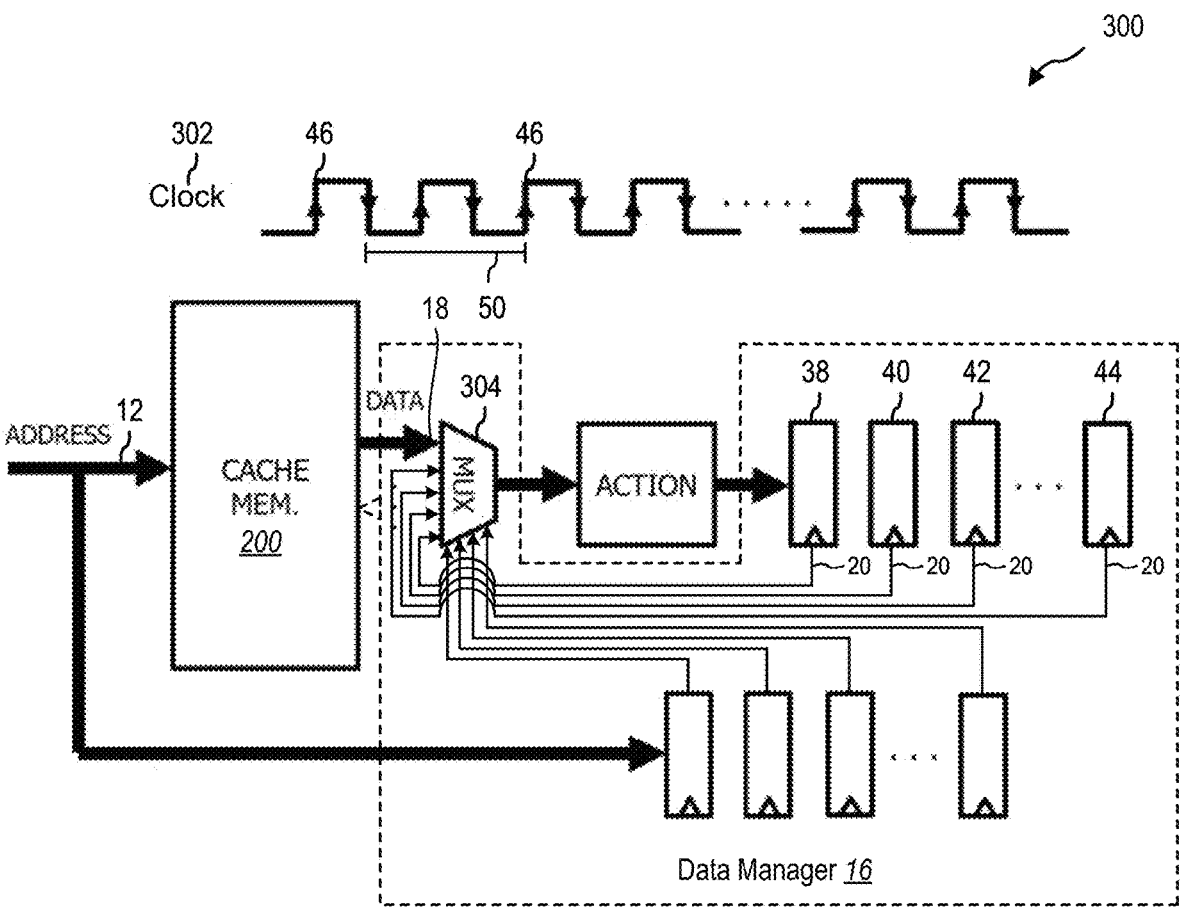
FIG. 3 illustrates an example environment for use with a cache memory in accordance with implementations of the present disclosure.

Referring now to FIG. 3, illustrated is an example environment 300 for use with the cache memory 200. The environment 300 illustrates a clock 302 with a clock signal. The environment 300 illustrates the data manager 16 with a multiplexer (MUX) 304 in communication with the action block 204. The environment 300 illustrates pipeline stages of the modified data 20 (e.g., the pipeline stage 38, the pipeline stage 40, the pipeline stage 42, the pipeline stage 44) after the action block 204 performs the action on the data 18. The number of pipeline stages is correlated to the latency parameter so that the number of pipeline stages of modified data 20 is equal to the clock cycles of the latency parameter. The latency parameter identifies the number of pipeline stages (clock cycles) required to complete the action performed by the action block 204.

The different possible combinations of the pipeline stages (e.g., the pipeline stage 38, the pipeline stage 40, the pipeline stage 42, the pipeline stage 44) of the modified data 20 are provided to the MUX 304. The data manager 16 determines which data (e.g., the data 18 or the modified data 20 from the pipeline stage) to provide from the MUX 304 to the action block 204 based on the cache input requests 12 received for the data 18. If multiple cache input request 12 are received for the data 18, the data manager 16 determines a pipeline stage correlation 50 between the cache input requests 12 for the same data 18 (e.g., a number of clock cycles that differ between the first cache input request received for the data 18 and the second cache input request received for the data 18). The data manager 16 uses the pipeline stage correlation between the cache input requests 12 and the latency parameter to determine which pipeline stage (e.g., the pipeline stage 38, the pipeline stage 40, the pipeline stage 42, the pipeline stage 44) to read the modified data 20 from to provide to the action block 204.

One example use case includes a first cache input request is received at clock cycle 46 for the data 18 and a second cache input request is received at clock cycle 48 for the same data 18. The data manager 16 provides the data 18 to the action block 204 to perform the action on the data 18 in response to the first cache input request.

The data manager 16 determines a pipeline stage correlation 50 (e.g., one clock cycle difference) between the clock cycle 48 when the second cache input request is received and the clock cycle 46 when the first cache input request is received. The data manager 16 uses the pipeline stage correlation 50 (one clock cycle) to determine which pipeline stage to read the modified data 20 from for use with the second cache input request. The data manager 16 determines that the pipeline stage 44 corresponds to the modified data 20 for the first cache input request based on the latency parameter of four clock cycles. The data manager 16 uses the pipeline stage correlation 50 (one clock cycle) between the first cache input request and the second cache input request to read the modified data 20 from the pipeline stage 40 for use with the second cache input request. The data manager 16 obtains the modified data 20 from the pipeline stage 40 from the MUX 304 and provides the modified data 20 to the action block 204 to perform the action on the modified data 20. By using the pipeline stage correlation 50 to identify which pipeline stage to obtain the modified data 20 from to provide to the action block 204, the data manager 16 prevents data hazards from occurring for subsequent cache input requests for the same data 18.

As the latency parameter changes (e.g., the actions performed by the action block 204 change or are modified), the number of pipeline stages (e.g., the pipeline stage 38, the pipeline stage 40, the pipeline stage 42, the pipeline stage 44) and the register stages for the address may change to correspond to the new latency parameter. For example, if the latency parameter is three clock cycles, the number of pipeline stages decrease to three. Another example includes if the latency parameter is six clock cycles, the number of pipeline stages increase to six.

Figure 4:
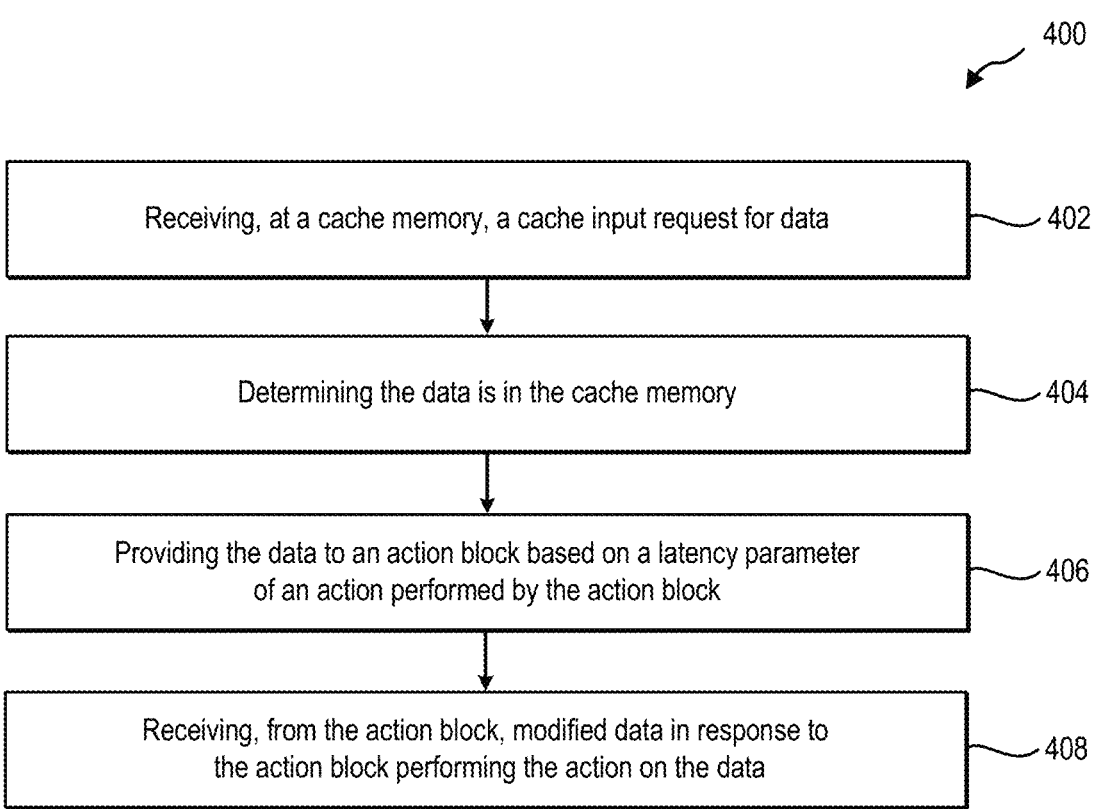
FIG. 4 illustrates an example method for providing data in the cache memory to an action block in accordance with implementations of the present disclosure.

Referring now to FIG. 4, illustrated is an example method 400 for providing data in the cache memory to an action block. The actions of the method 400 are discussed below with reference to FIGS. 2 and 3.

At 402, the method 400 includes receiving, at a cache memory, a cache input request for data. The cache memory 200 includes a tag manager 10 that receives a cache input request 12. The cache input request 12 identifies data 18 to send to the action block 204. In some implementations, the cache input request 12 also identifies an action to perform on the data 18. In some implementations, the actions are mathematical operations performed on the data 18. In some implementations, the actions are logical operations performed on the data 18. In some implementations, the actions are a combination of both mathematical and logical operations performed on the data 18. In some implementations, the action block 204 performs a single action on the data 18. In some implementations, the action block 204 performs a plurality of actions on the data 18. The plurality of actions includes the same latency and throughput for performing the actions.

At 404, the method 400 includes determining the data is in the cache memory. The tag manager 10 determines whether the data 18 identified in the cache input request 12 is in the cache memory 200 (a cache hit) or the data 18 requested in the cache input request 12 is in the main memory 206 (a cache miss). If a cache hit occurs (the tag manager 10 determines that the data 18 is in the cache memory 200), the tag manager 10 forwards the cache input request 12 to a first in first out (FIFO) queue 14 of the cache input requests 12. A data manager 16 in communication with the FIFO queue 14 obtains the data 18 from the cache memory 200 requested in the cache input request 12. The data manager 16 processes the incoming cache input requests 12 in order by using the FIFO queue 14.

At 406, the method 400 includes providing, in response to the cache input request, the data to an action block based on a latency parameter of an action performed by the action block. The data manager 16 provides the data 18 to the action block 204 based on a latency parameter. The latency parameter identifies a number of clock cycles to complete the action by the action block 204. In some implementations, the data manager 16 provides the data 18 to the action block 204 based on the latency parameter and a cycles per operation parameter for the action(s) provided by the action block 204. The cycles per operation parameter identifies a throughput of the action block 204 for performing the action.

In some implementations, the latency parameter and the cycles per operation parameter are modified based on the different actions that the action block 204 applies to the data 18, resulting in easier configurability or modifications of the actions performed by the action block 204. In some implementations, the latency parameter and the cycles per operation parameters are provided to the data manager 16 during initialization of the cache memory 200. For example, a user identifies the actions for the action block 204 to perform and provides the latency parameter and the cycles per operations parameters to the cache memory 200 for the selected actions.

At 408, the method 400 includes receiving, from the action block, modified data in response to the action block performing the action on the data. The action block 204 receives the data 18 and performs one or more actions on the data 18. The action block 204 responds to the data manager 16 with the modified data 20 based on the action applied to the data 18. The data manager 16 receives the modified data 20 from the action block 204 in response to the action block 204 performing the action on the data 18.

The action block 204 outputs the modified data 20 in a plurality of pipeline stages (e.g., the pipeline stage 38, the pipeline stage 40, the pipeline stage 42, the pipeline stage 44) based on a cycles per operation parameter that identifies a throughput of the action block 204 for performing the action. The plurality of pipeline stages (e.g., the pipeline stage 38, the pipeline stage 40, the pipeline stage 42, the pipeline stage 44) are output from the action block 204 at different clock cycles.

The number of pipeline stages to include in the plurality of pipeline stages (e.g., the pipeline stage 38, the pipeline stage 40, the pipeline stage 42, the pipeline stage 44) is based on the latency parameter so that the number of pipeline stages (e.g., the pipeline stage 38, the pipeline stage 40, the pipeline stage 42, the pipeline stage 44) of the modified data 20 output from the action block 204 is equal to the clock cycles of the latency parameter. As the latency parameter changes (e.g., the actions performed by the action block 204 change or are modified), the number of pipeline stages (e.g., the pipeline stage 38, the pipeline stage 40, the pipeline stage 42, the pipeline stage 44) may change to correspond to the new latency parameter.

In some implementations, the method 400 further includes receiving a second cache input request for the data; determining a pipeline stage correlation between the cache input request and the second cache input request; using the pipeline stage correlation and the latency parameter to identify a pipeline stage from the plurality of pipeline stages for reading the modified data from for the second cache input request; and providing, in response to the second cache input request, the modified data to the action block to perform the action on the modified data.

The data manager 16 handles the forwarding logic and the timing considerations for the cache input requests 12 to prevent data hazards from occurring when multiple cache input requests 12 are for the same data 18 in the cache memory 200. The data manager 16 uses the latency parameter and the cycles per operation parameter to determine whether the modified data 20 is in the cache memory 200 for the subsequent cache input requests 12. The data manager 16 reads the modified data 20 for the subsequent cache input requests 12 from different pipeline stages instead of the cache memory 200 in response to determining that the modified data 20 is not in the cache memory 200 (e.g., the action block 204 has not provided the modified data 20 to the data manager 16 in response to performing the action on the data 18 for the previous cache input request 12).

In some implementations, the data manager 16 determines a pipeline stage correlation between the two cache input requests 12 for the same data 18. The pipeline stage correlation is a number of clock cycles between receiving the cache input request 12 for the data 18 and receiving the second cache input request 12 for the data 18. The data manager 16 uses the pipeline stage correlation between the two cache input requests 12 in combination with the latency and cycle per operation parameters to determine which pipeline stage (e.g., clock cycle) to read the modified data 20 from for the second cache input request 12 received for the same data 18. The data manager 16 provides the modified data 20 to the action block 204 to perform the action on the modified data 20 for the second cache input request 12. By using the latency and the cycle per operation parameters to determine which pipeline stage to read the modified data 20 from, the data manager 16 handles the data forwarding and timing for the different cache input request 12, preventing data hazards from occurring in response to receiving multiple cache input requests 12 for the same data 18 in the cache memory 200.

The method 400 provides parameterized data forwarding for data stored in the cache memory 200 using the latency parameter and/or the cycles per operation parameter to forward the data 18 from the cache memory 200 to the action block 204.

Referring now to FIG. 5, illustrated is an example method 500 for providing data to an action block in response to determining the data is in a cache memory. The actions of the method 500 are discussed below with reference to FIGS. 2 and 3.

At 502, the method 500 includes receiving, at a cache memory, a cache input request for data. The cache memory 200 includes a tag manager 10 that receives a cache input request 12. The cache input request 12 identifies data 18 to send to the action block 204. In some implementations, the cache input request 12 also identifies an action to perform on the data 18. In some implementations, the actions are mathematical operations performed on the data 18. In some implementations, the actions are logical operations performed on the data 18. In some implementations, the actions are a combination of both mathematical and logical operations performed on the data 18. In some implementations, the action block 204 performs a single action on the data 18. In some implementations, the action block 204 performs a plurality of actions on the data 18. The plurality of actions includes the same latency and throughput for performing the actions.

At 504, the method 500 includes determining the data is in a main memory. The tag manager 10 determines whether the data 18 identified in the cache input request 12 is in the cache memory 200 (a cache hit) or the data 18 requested in the cache input request 12 is in the main memory 206 (a cache miss). If a cache miss occurs (the tag manager 10 determines that the data 18 identified in the cache input request 12 is in the main memory 206 instead of the cache memory 200 or determines that the data entry in the cache memory 200 for the data 18 has been invalidated), the tag manager 10 forwards the cache input request 12 to a FIFO queue 28. The tag manager 10 also forwards the cache input request 12 to the FIFO queue 14 of the cache input requests 12. The cache input requests 12 are placed in the FIFO queue 14 based on an order of receiving the cache input requests 12. Thus, as additional cache input requests 12 are received by the cache memory 200, the additional cache input requests 12 are placed into the FIFO queue 14 based on an order of receiving the additional cache input requests 12.

At 506, the method 500 includes providing a read request for the data in the main memory. A read request component 30 obtains the cache input request 12 from the FIFO queue 28 and provides a read command 32 to the main memory 206 for the data 18 identified in the cache input request 12.

At 508, the method 500 includes receiving, in response to the read request, the data in the cache memory. The data manager 16 receives the data 18 from the read response component 34. A read response component 34 receives the data 18 read from the main memory 206 and provides the data 18 to the data manager 16.

At 510, the method 500 includes reading the cache input request that corresponds to the data. The data manager 16 obtains the cache input request 12 in the FIFO queue 14 and provides parameterized data forwarding of the data 18 identified in the cache input request 12 to the action block 204. In some implementations, the data manager 16 triggers a synchronization signal to the FIFO queue 14 to read the cache input request 12 a front of the FIFO queue 14 and the corresponding data 18 from the cache memory 200 for the cache input request 12.

At 512, the method 500 includes providing, in response to the cache input request, the data to an action block based on a latency parameter of an action performed by the action block and a cycles per operation parameter of the action block. The data manager 16 provides the data 18 to the action block 204 based on a latency parameter. The latency parameter identifies a number of clock cycles to complete the action by the action block 204. In some implementations, the data manager 16 provides the data 18 to the action block 204 based on the latency parameter and a cycles per operation parameter for the action(s) provided by the action block 204. The cycles per operation parameter identifies a throughput of the action block 204 for performing the action.

In some implementations, the latency parameter and the cycles per operation parameter are modified based on the different actions that the action block 204 applies to the data 18, resulting in easier configurability or modifications of the actions performed by the action block 204. In some implementations, the latency parameter and the cycles per operation parameters are provided to the data manager 16 during initialization of the cache memory 200. For example, a user identifies the actions for the action block 204 to perform and provides the latency parameter and the cycles per operations parameters to the cache memory 200 for the selected actions.

At 514, the method 500 includes receiving, from the action block, modified data in response to the action block performing the action. The action block 204 receives the data 18 and performs one or more actions on the data 18. The action block 204 responds to the data manager 16 with the modified data 20 based on the action applied to the data 18. The data manager 16 receives the modified data 20 from the action block 204 in response to the action block 204 performing the action on the data 18.

The action block 204 outputs the modified data 20 in a plurality of pipeline stages (e.g., the pipeline stage 38, the pipeline stage 40, the pipeline stage 42, the pipeline stage 44) based on a cycles per operation parameter that identifies a throughput of the action block 204 for performing the action. The plurality of pipeline stages (e.g., the pipeline stage 38, the pipeline stage 40, the pipeline stage 42, the pipeline stage 44) are output from the action block 204 at different clock cycles.

The number of pipeline stages to include in the plurality of pipeline stages (e.g., the pipeline stage 38, the pipeline stage 40, the pipeline stage 42, the pipeline stage 44) is based on the latency parameter so that the number of pipeline stages (e.g., the pipeline stage 38, the pipeline stage 40, the pipeline stage 42, the pipeline stage 44) of the modified data 20 output from the action block 204 is equal to the clock cycles of the latency parameter. As the latency parameter changes (e.g., the actions performed by the action block 204 change or are modified), the number of pipeline stages (e.g., the pipeline stage 38, the pipeline stage 40, the pipeline stage 42, the pipeline stage 44) may change to correspond to the new latency parameter.

In some implementations, the method 500 further includes receiving a second cache input request for the data; determining a pipeline stage correlation between the cache input request and the second cache input request; using the pipeline stage correlation and the latency parameter to identify a pipeline stage from the plurality of pipeline stages for reading the modified data from for the second cache input request; and providing, in response to the second cache input request, the modified data to the action block to perform the action on the modified data.

The data manager 16 handles the forwarding logic and the timing considerations for the cache input requests 12 to prevent data hazards from occurring when multiple cache input requests 12 are for the same data 18 in the cache memory 200. The data manager 16 uses the latency parameter and the cycles per operation parameter to determine whether the modified data 20 is in the cache memory 200 for the subsequent cache input requests 12. The data manager 16 reads the modified data 20 for the subsequent cache input requests 12 from different pipeline stages instead of the cache memory 200 in response to determining that the modified data 20 is not in the cache memory 200 (e.g., the action block 204 has not provided the modified data 20 to the data manager 16 in response to performing the action on the data 18 for the previous cache input request 12).

In some implementations, the data manager 16 determines a pipeline stage correlation between the two cache input requests 12 for the same data 18. The pipeline stage correlation is a number of clock cycles between receiving the cache input request 12 for the data 18 and receiving the second cache input request 12 for the data 18. The data manager 16 uses the pipeline stage correlation between the two cache input requests 12 in combination with the latency and cycle per operation parameters to determine which pipeline stage (e.g., clock cycle) to read the modified data 20 from for the second cache input request 12 received for the same data 18. The data manager 16 provides the modified data 20 to the action block 204 to perform the action on the modified data 20 for the second cache input request 12. By using the latency and the cycle per operation parameters to determine which pipeline stage to read the modified data 20 from, the data manager 16 handles the data forwarding and timing for the different cache input request 12, preventing data hazards from occurring in response to receiving multiple cache input requests 12 for the same data 18 in the cache memory 200.

The method 500 provides parameterized data forwarding using the latency parameter and/or the cycles per operation parameter to forward the data 18 from the cache memory 200 to the action block 204.

Figure 6:
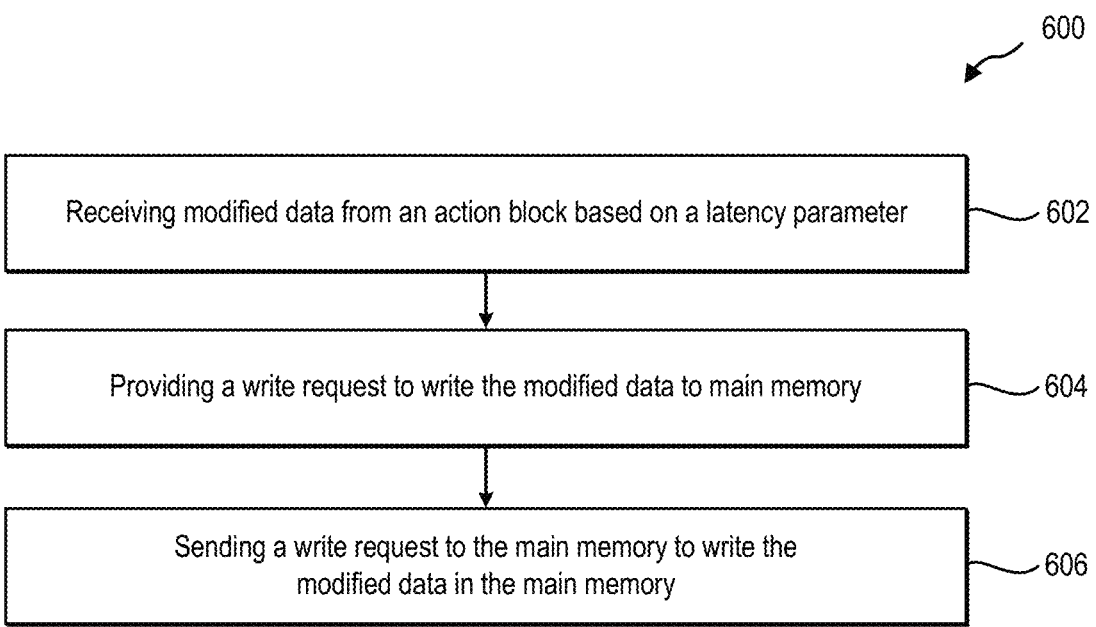
FIG. 6 illustrates an example method for writing modified data from a cache memory to main memory in accordance with implementations of the present disclosure.

Referring now to FIG. 6, illustrated is an example method 600 for writing modified data from a cache memory to main memory. The actions of the method 600 are discussed below with reference to FIGS. 2 and 3.

At 602, the method 600 includes receiving modified data from an action block based on a latency parameter. The data manager 16 receives the modified data 20 from the action block 204 based on a latency parameter that identifies a number of clock cycles for the action block 204 to perform an action on the data 18. In some implementations, the data manager 16 receives the modified data 20 from the action block based on the latency parameter and a cycles per operation parameter of the action block 204 that identifies a throughput of the action block 204 for performing the action. The action block 204 receives the data 18 and performs one or more actions on the data 18 and the action block 204 responds to the data manager 16 with the modified data 20 based on performing the action on the data 18.

At 604, the method 600 includes providing a write request to write the modified data to main memory. The data manager 16 provides a write request to a write back component 22 to write the modified data 20 to the main memory 206. In some implementations, the data manager 16 periodically provides the write request to the write back component 22.

At 606, the method 600 includes sending the write request to the main memory to write the modified data in the main memory. A write back component in communication with the data manager 16 sends the write request 24 to write the modified data to the main memory 206. The write back component 22 provides a write back response 26 to the data manager 16 indicating that the modified data 20 has been written to the main memory 206.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:

receiving, at a cache memory, a cache input request for data;

determining the data is in the cache memory;

providing, in response to the cache input request, the data to an action block based on a latency parameter of an action performed by the action block, wherein the latency parameter identifies a number of clock cycles to complete the action by the action block; and receiving, from the action block, modified data in response to the action block performing the action on the data, wherein the modified data is output in a plurality of pipeline stages based on a cycles per operation parameter that identifies a throughput of the action block performing the action and a number of pipeline stages in the plurality of pipeline stages is equal to the number of clock cycles of the latency parameter.

2. The method of claim 1, wherein providing the data to the action block is further based on a cycles per operation parameter that identifies a throughput of the action block for performing the action.

3. The method of claim 1, further comprising:

receiving a second cache input request for the data;

determining a pipeline stage correlation between the cache input request and the second cache input request, wherein the pipeline stage correlation is a number of clock cycles between receiving the cache input request and receiving the second cache input request; and using the pipeline stage correlation and the latency parameter to identify a pipeline stage from the plurality of pipeline stages for reading the modified data from for the second cache input request.

4. The method of claim 3, wherein the plurality of pipeline stages are output from the action block at different clock cycles.

5. The method of claim 3, wherein the pipeline stage correlation is a number of clock cycles between receiving the cache input request and receiving the second cache input request.

6. The method of claim 3, further comprising:

providing, in response to the second cache input request, the modified data to the action block to perform the action on the modified data.

7. The method of claim 3, wherein a number of pipeline stages to include in the plurality of pipeline stages is based on the latency parameter.

8. The method of claim 1, wherein the latency parameter and the number of clock cycles to complete the action are modified based on different actions the action block applies to the data.

\* \* \* \* \*